(12) United States Patent
Romanov et al.

(10) Patent No.: US 10,107,128 B2
(45) Date of Patent: Oct. 23, 2018

(54) COOLING CHANNELS FOR GAS TURBINE ENGINE COMPONENT

(71) Applicant: United Technologies Corporation, Hartford, CT (US)

(72) Inventors: Dmitriy A. Romanov, Wells, ME (US); Dominic J. Mongillo, Jr., West Hartford, CT (US); Matthew A. Devore, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 545 days.

(21) Appl. No.: 14/830,812

(22) Filed: Aug. 20, 2015

(65) Prior Publication Data

US 2017/0051623 A1     Feb. 23, 2017

(51) Int. Cl.
*F01D 11/08*     (2006.01)
*F01D 25/12*     (2006.01)

(52) U.S. Cl.
CPC ........... *F01D 11/08* (2013.01); *F01D 25/12* (2013.01); *F05D 2240/11* (2013.01); *F05D 2240/127* (2013.01); *F05D 2250/185* (2013.01); *F05D 2260/2212* (2013.01); *Y02T 50/676* (2013.01)

(58) Field of Classification Search
CPC ................... F01D 11/08; F01D 25/12
See application file for complete search history.

(56) References Cited

U.S. PATENT DOCUMENTS

| | | |
|---|---|---|
| 4,573,866 A | 3/1986 | Sandy, Jr. et al. |
| 4,679,981 A | 7/1987 | Guibert et al. |
| 5,375,973 A | 12/1994 | Sloop et al. |
| 5,486,090 A | 1/1996 | Thompson et al. |
| 5,538,393 A | 7/1996 | Thompson et al. |
| 5,584,651 A | 12/1996 | Pietraszkiewicz |
| 6,139,257 A | 10/2000 | Proctor et al. |
| 6,170,831 B1 | 1/2001 | Bouchard |
| 6,779,597 B2 | 8/2004 | DeMarche et al. |
| 7,093,835 B2 | 8/2006 | Addis |
| 7,306,424 B2 | 12/2007 | Romanov et al. |
| 7,513,040 B2 | 4/2009 | Cunha et al. |
| 8,061,979 B1 | 11/2011 | Liang |
| 8,449,246 B1 | 5/2013 | Liang |
| 8,727,704 B2 | 5/2014 | Lee et al. |
| 2006/0140753 A1 | 6/2006 | Romanov et al. |
| 2007/0041827 A1 | 2/2007 | Camus |

FOREIGN PATENT DOCUMENTS

| | | |
|---|---|---|
| EP | 1343950 | 9/2003 |
| EP | 2894302 | 7/2015 |

OTHER PUBLICATIONS

Extended European Search Report for European Application No. 16185200.9 dated Jan. 23, 2017.

*Primary Examiner* — Woody Lee, Jr.
(74) *Attorney, Agent, or Firm* — Carlson, Gaskey & Olds, P.C.

(57) ABSTRACT

A gas turbine engine component includes a wall portion and a leading edge cooling channel that extends through the wall portion. The leading edge cooling channel includes at least one first cooling passage separated from at least one serpentine cooling passage.

18 Claims, 4 Drawing Sheets

COOLING CHANNELS FOR GAS TURBINE ENGINE COMPONENT

STATEMENT REGARDING FEDERALLY SPONSORED RESEARCH OR DEVELOPMENT

This invention was made with government support under Contract No. FA8650-09-D-2923-0021, awarded by the United States Air Force. The Government has certain rights in this invention.

BACKGROUND

This disclosure relates to a gas turbine engine, and more particularly to a blade outer air seal (BOAS) that may be incorporated into a gas turbine engine.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other loads.

The compressor and turbine sections of a gas turbine engine include alternating rows of rotating blades and stationary vanes. The turbine blades rotate and extract energy from the hot combustion gases that are communicated through the gas turbine engine. The turbine vanes direct the hot combustion gases at an angle of entry into a downstream row of blades.

An engine case of an engine static structure may include one or more blade outer air seals (BOAS) that establish an outer radial flow path boundary for channeling the hot combustion gases. Therefore, there is a need to effectively cool the BOAS in order to channel the hot combustion gases.

SUMMARY

In one exemplary embodiment, a gas turbine engine component includes a wall portion and a leading edge cooling channel that extends through the wall portion. The leading edge cooling channel includes at least one first cooling passage separated from at least one serpentine cooling passage.

In a further embodiment of the above, a plurality of trip strips is along at least one of a leading edge or a circumferential edge of the leading edge cooling channel.

In a further embodiment of any of the above, at least one first cooling passage includes a flow director in a bend of at least one first cooling passage.

In a further embodiment of any of the above, at least one serpentine passage includes a serpentine channel rib that extends at least partially along a length of at least one serpentine passage along a mid-portion of at least one serpentine passage.

In a further embodiment of any of the above, a plurality of cooling channeling extends radially inward and upstream from a cooling cavity at least partially defined by the component through the component to the leading edge cooling channel.

In a further embodiment of any of the above, at least one first cooling passage includes a pair of first cooling passages and at least one serpentine cooling passage includes a pair of serpentine cooling passages. The pair of first cooling passages is L-shaped and at least partially surrounds a corresponding one of the pair of serpentine cooling passages.

In a further embodiment of any of the above, the pair of first cooling passages is separated from each other by a central wall that extends axially relative to a longitudinal axis of the gas turbine engine through the leading edge cooling passage.

In a further embodiment of any of the above, the pair of first cooling passages and the pair of serpentine cooling passages mirror each other about the central wall and the pair of serpentine cooling passages include an axially extending portion along opposing edges of the component.

In a further embodiment of any of the above, each of the pair of serpentine passages are located downstream of a corresponding one of the pair of first cooling passages. Each of the pair of first cooling passages is separated from each of the pair of serpentine passages by an intermediate wall.

In another exemplary embodiment, a gas turbine engine assembly includes a blade outer air seal including a leading edge cooling channel that extends through a wall portion. The leading edge cooling channel includes at least one first cooling passage separated from at least one serpentine cooling passage.

In a further embodiment of any of the above, a brush seal is at least partially axially aligned with the leading edge cooling channel.

In a further embodiment of any of the above, a plurality of cooling channeling extends radially inward and upstream from a cooling cavity at least partially defined by the blade outer air seal and through the blade outer air seal to the leading edge cooling channel.

In a further embodiment of any of the above, at least one first cooling passage includes a pair of first cooling passages and the at least one serpentine cooling passage includes a pair of serpentine cooling passages. The pair of first cooling passages is L-shaped and at least partially surround a corresponding one of the pair of serpentine cooling passages. A plurality of trip strips is along at least one of a leading edge or a circumferential edge of the leading edge cooling channel.

In a further embodiment of any of the above, at least one first cooling passage includes a flow director located in a bend of at least one first cooling passage.

In a further embodiment of any of the above, at least one serpentine passage includes a serpentine channel rib that extends at least partially along a length of at least one serpentine passage along a mid-portion of at least one serpentine passage.

In a further embodiment of any of the above, the pair of first cooling passages and the pair of serpentine cooling passages mirror each other about a central wall and the pair of serpentine cooling passages include an axially extending portion along opposing edges of the component.

In another exemplary embodiment, a method of cooling a component in a gas turbine engine includes directing a cooling fluid through a cooling channel in the component from a cooling cavity adjacent the component to a leading edge cooling channel. The cooling fluid is directed outward towards opposing circumferential ends of the component through a first pair of cooling passages and a pair of serpentine passages.

In a further embodiment of any of the above, the first pair of cooling passages and the pair of serpentine passages mirror each other. The cooling fluid is directed radially inward and upstream through the cooling channel.

In a further embodiment of any of the above, the cooling fluid is directed through each of the first pair of cooling passages with a flow director located in a bend in each of the first pair of cooling channels.

In a further embodiment of any of the above, the cooling fluid is directed through each of the pair of serpentine passages with a serpentine channel rib that extends at least partially along a length of each of the pair of serpentine passages along a mid-portion of each of the pair of serpentine passages and the pair of serpentine passages include a portion that extends in an axial direction.

DETAILED DESCRIPTION

Figure 1:
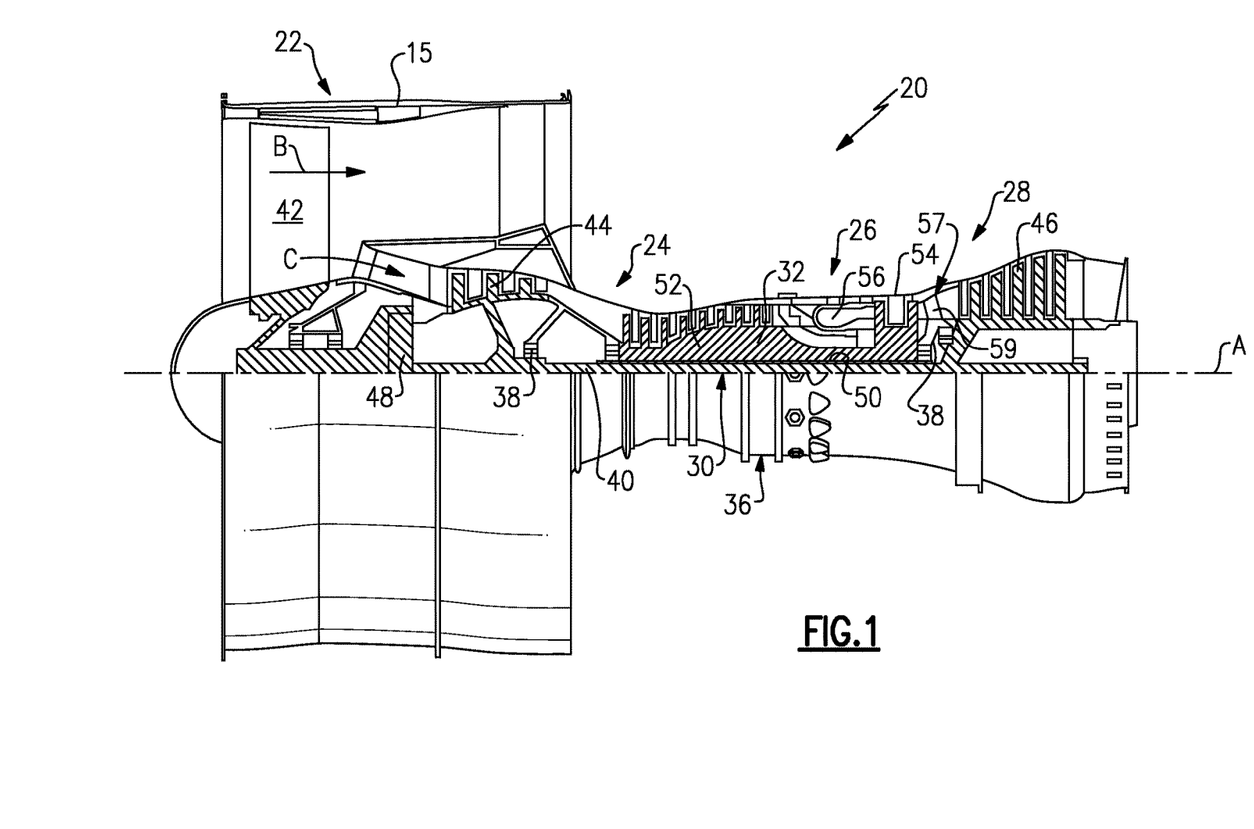
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ\ R)/(518.7^\circ\ R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate the fan section 22 and therefore the relationship between the number of turbine rotors 34 in low pressure turbine 46 and number of blades 42 in fan section 22 disclose an example gas turbine engine 20 with increased power transfer efficiency.

Figure 2:
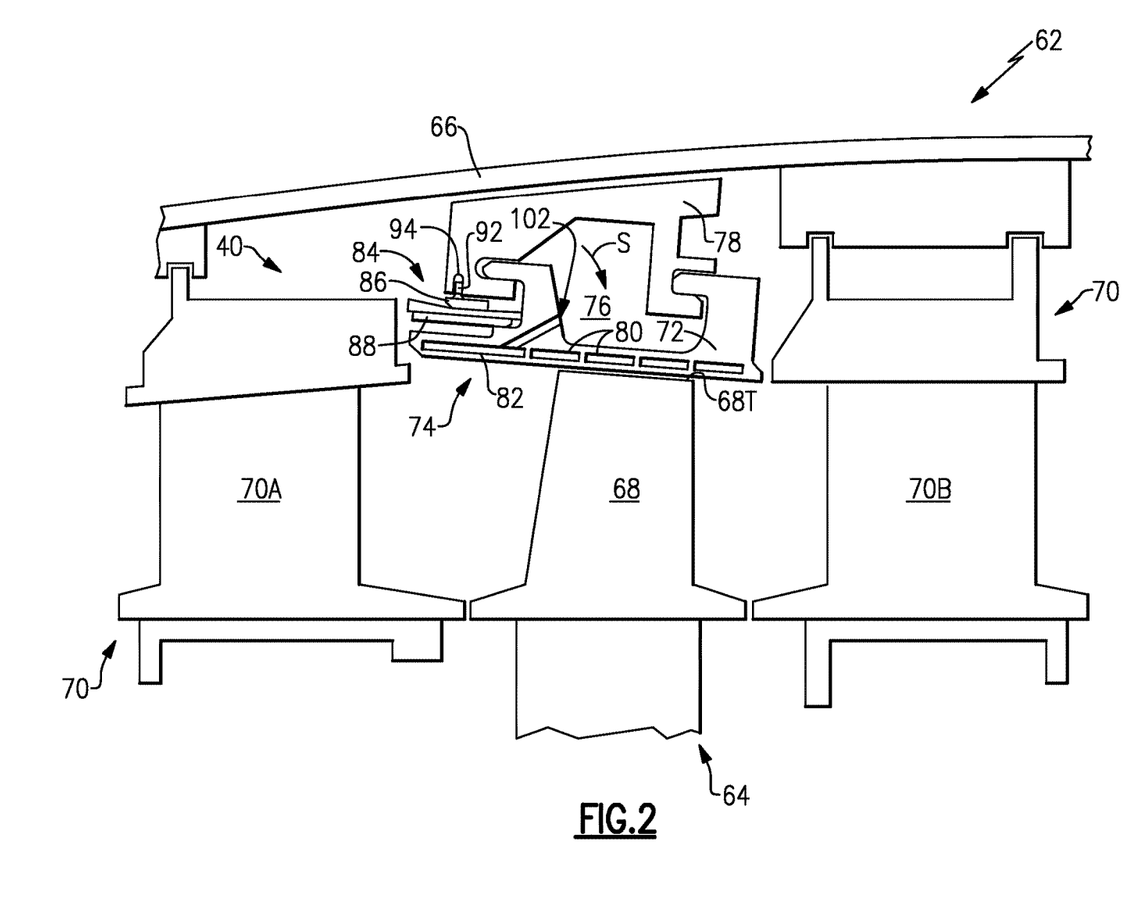
FIG. 2 illustrates a cross-section view of a portion of the gas turbine engine of FIG. 1.

FIG. 2 illustrates a portion 62 of a gas turbine engine, such as the gas turbine engine 20 of FIG. 1. In the illustrated embodiment, the portion 62 is representative of the high pressure turbine 54. However, it should be appreciated that other portions of the gas turbine engine 20 could benefit from the teachings of this disclosure, including but not limited to, the compressor section 24, and the low pressure turbine 46.

In one exemplary embodiment, a rotor disk 64 (only one shown, although multiple disks could be disposed within the portion 62) is mounted for rotation about the engine centerline longitudinal axis A relative to an engine case 66 of the engine static structure 33 (see FIG. 1). The portion 62 includes at least one row of rotating blades 68 (mounted to the rotor disk 64) and vanes 70A, 70B of vane assemblies 70 that are also supported relative to the engine case 66.

Each of the blades 68 on the rotor disk 64 extends to a blade tip 68T at a radially outermost portion of the blade 68. The blade tip 68T extends toward a blade outer air seal (BOAS) 72. The BOAS 72 may be a segment of a BOAS assembly 74. For example, a plurality of BOAS 72 may be circumferentially positioned relative to one another to provide a segmented BOAS assembly 74 that generally surrounds the rotor disk 64 and the blades 68 carried by the rotor disk 64.

A cooling cavity 76 is at least partially defined by the BOAS 72 and a support structure 78 that secures the BOAS 72 relative to the engine case 66. In another non-limiting embodiment, the cooling cavity 76 is defined by at least the BOAS 72. Cooling fluid S enters the cooling cavity 76 and travels into cooling channels 80 and a leading edge cooling channel 82 on an upstream portion of the BOAS 72 relative to the downstream cooling channels 80 on a downstream portion. The leading edge cooling channel 82 is located in a wall portion of the BOAS 72 with a reduced thickness, such as a leading edge cantilevered portion of the BOAS 72. Similarly, the leading edge cooling channel 82 could be located in a platform portion of a vane. In one non-limiting embodiment, the cooling fluid S is airflow sourced from the high pressure compressor 52 or another upstream portion of the gas turbine engine 20 with operating temperatures less than the operating temperature of the portion 62.

A brush seal 84 is located radially outward form and at least partially axially aligned with the leading edge cooling channel 82. The brush seal 84 creates a seal between the BOAS 72 and an axially upstream component, such as the vane 70A. The brush seal 84 includes a first seal ring 86, a second seal ring 88, and a plurality of bristles 90 extending between the first and second seal rings 86, 88 in an axial direction. A forward end of the plurality of bristles 90 are in contact or close proximity with a portion of the vane 70A and an aft end of the plurality of bristles 90 are in contract or in close proximity to the BOAS 72. In the illustrated non-limiting embodiment, the first seal ring 86 includes a locating tab 92 that fits within a recessed area 94 in the support structure 78 to maintain the brush seal 84 at a constant axial position relative to the support structure 78. However, other seals that contact or come into close proximity with a portion of the vane 70A and the BOAS 72 could be used in place of the brush seal 84.

Figure 3:
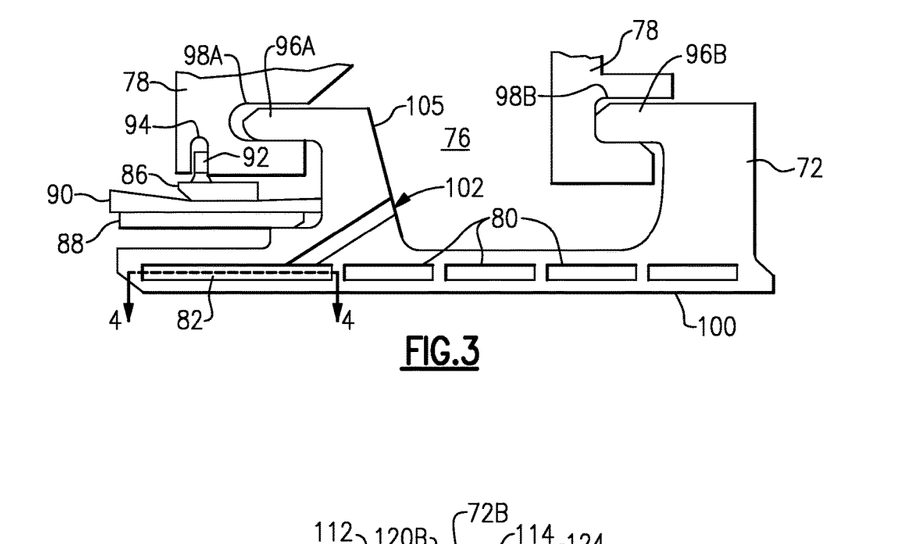
FIG. 3 illustrates an enlarged view of a blade outer air seal.

FIG. 3, with continued reference to FIG. 2, illustrates an enlarged view of the BOAS 72 that may be incorporated into a portion of the gas turbine engine 20, such as the portion 62 shown FIG. 2. The BOAS 72 includes a forward retention tab 96A and an aft retention tab 96B. The forward retention tab 96A mates with a forward recess 98A on the support structure 78 and the aft tab 96B mates with an aft recess 98B on the support structure 78 to secure the BOAS 72 relative to the support structure 78. A radially inner side of the BOAS 72 includes a clearance surface 100. The clearance surface 100 maintains a small clearance with the blade tip 68T of the blade 68 to reduce gases from passing past the blade tip 68T. The gases passing over the blade tip reduce the efficiency of the gas turbine engine 20.

As shown in FIG. 3, the leading edge cooling channel 82 is located axially forward of the cooling cavity 76 and is at least partially axially aligned with the brush seal 84. Inlet holes 102 direct the cooling fluid S from the cooling cavity 76 to the leading edge cooling channel 82 without compromising or interfering with the plurality of bristles 90 on the brush seal 84. Although only one inlet hole 102 is shown in FIG. 3, multiple inlet holes 102 are incorporated into the BOAS 72. In the illustrated non-limiting embodiment, the inlet hole 102 extends through a projection 105 on the BOAS 72 in a radially inward and upstream direction relative to the axis A. The projection 105 includes the tab 96A at a distal end for engaging the recessed area 98A in the support structure 78.

Figure 4:
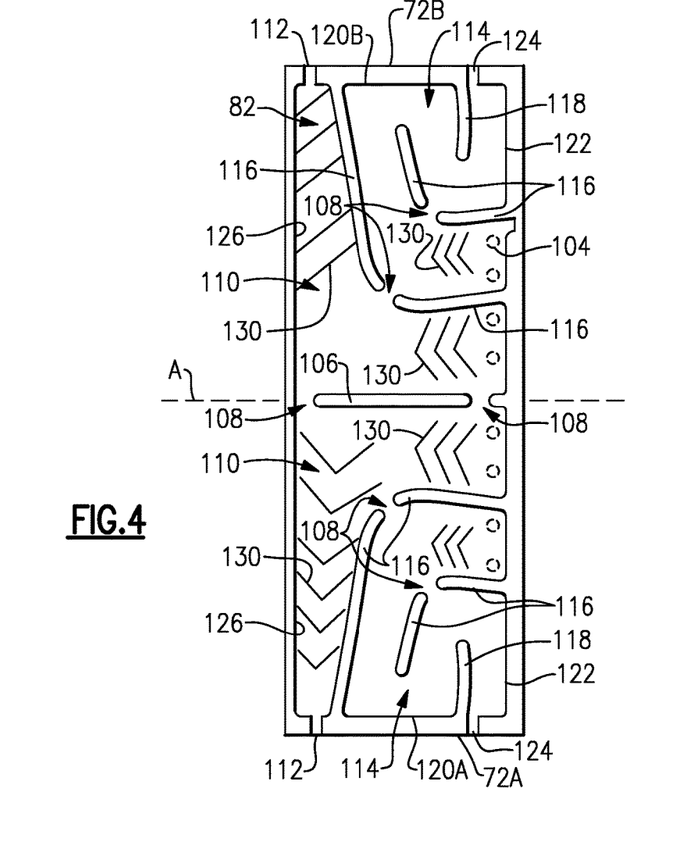
FIG. 4 is a cross-sectional view taken along line 4-4 of FIG. 3 showing a leading edge cooling channel according to a first embodiment.

FIG. 4 illustrates a cross-sectional view of the leading edge cooling channel 82 according to a first non-limiting embodiment taken along line 4-4 of FIG. 3. The leading edge cooling channel 82 extends between opposing circumferential ends 72A, 72B of the BOAS 72. Inlets 104 into the leading edge cooling channel 82 from the inlet holes 102 are shown in dashed lines to indicate the location of the cooling fluid S entering the leading edge cooling channel 82. In the illustrated non-limiting embodiment, the inlets 104 are located adjacent a downstream edge 122 of the leading edge cooling channel 82. In another non-limiting embodiment, the inlets 104 are located in an axial mid-portion of the leading edge cooling channel 82.

The leading edge cooling channel 82 is generally symmetric about a central dividing wall 106 that extends parallel to the axis A of the gas turbine engine 20, such that opposing sides of the leading edge cooling channel 82 mirror each other. The opposing sides of the leading edge cooling channel 82 may mirror each other and still include variations in the width of the passages or locations of specific structures while still mirroring the same pattern to tailor the cooling requirements of the opposing sides. In another non-limiting embodiment, the opposing sides are mirror images of each other. The central dividing wall 106 includes bridges 108 that form discontinuities in the central dividing wall 106. The bridges 108 are formed to improve the manufacturability of the leading edge cooling channel 82 and to improve rigidity of the BOAS 72. The bridges 108 can also increase convective heat transfer by introducing turbulence into the cooling fluid S traveling through the leading edge cooling channel 82.

A pair of L-shaped passages 110 are located immediately adjacent each side of the central dividing wall 106. Although the L-shaped passages 110 are shown in pairs, the leading edge cooling channel 82 could include only a single L-shaped passage 110. The pair of L-shaped passages 110 taper toward outlets 112 adjacent the opposing circumferential ends 72A, 72B of the BOAS 72. The outlets 112 may be shifted axially relative to the axis A between the opposing circumferential ends 72A, 72B. Each of the pair of L-shaped passages 110 begin adjacent the inlets 104 of the inlet holes 102 adjacent a downstream edge 122 of the leading edge cooling channel 82 and extend at least partially along a leading edge 126 of the leading edge cooling channel 82 and an intermediate wall 116.

Serpentine passages 114 are at least partially defined by the intermediate walls 116 and an end wall 118. Although the serpentine passages 114 are shown in pairs, the leading edge cooling channel 82 could include only a single serpentine passages 114. Circumferential edges 120A, 120B and the downstream edge 122 also at least partially define the serpentine passages 114. The serpentine passage 114 includes a portion that extends in the axial direction along the circumferential edges 120A and 120B to further increase cooling on the opposing circumferential ends 72A and 72B of the BOAS 72. The intermediate walls 116 also include the bridges 108 that form discontinuities in the intermediate walls 116. The bridges 108 are formed to improve the manufacturability of the leading edge cooling channel 82 and to improve rigidity of the BOAS 72. The intermediate walls 116 include a curvature and extend between the downstream edge 122 and contact or are located adjacent to a corresponding one of the circumferential edges 120A, 120B. The cooling fluid exits the serpentine passages 114 through downstream outlets 124 adjacent the downstream edge 122 of the leading edge cooling channel 82. The downstream outlets 124 may be shifted axially relative to the axis A between the opposing circumferential ends 72A, 72B.

Additionally, trip strips 130 are located in the L-shaped passages 110 and the serpentine passages 114. The trip strips 130 may be chevron shaped, skewed, segmented skewed, perpendicular to the flow, or in the form of pedestals. Although the L-shaped passages 110 are shown with a combination a chevron and skewed trip strips 130 along the leading edge 126, the L-shaped passages 110 could also include all chevron shaped trip strips 130 or all skewed trip strips 130 along the leading edge 126.

The trip strips 130 may also be located in the entirety of the L-shaped passages 110 and the serpentine passages 114 or only in select portions of the L-shaped passages 110 and the serpentine passages 114 as shown in FIG. 4. The trip strips 130 introduce turbulence into the cooling fluid S traveling through the leading edge cooling channel 82 and convective heat transfer between the cooling fluid S and the surrounding structure of the BOAS 72.

The trip strips 130 are oriented to ensure maximum internal convective heat transfer at the leading edge of the trip strips 130 adjacent the high heat load along the leading edge 126 of the leading edge cooling channel 82. The two separate L-shaped passages 110 allow for tailoring of circumferential flow distribution in order to optimize the convective heat transfer and cooling air heat pickup in each L-shaped passage 110 independently. Flow and trip strip 130 spacing can be tailored depending on non-uniformity of circumferential external heat load distribution resulting from a fuel nozzle, a vane count, and a BOAS 72 count.

Figure 5:
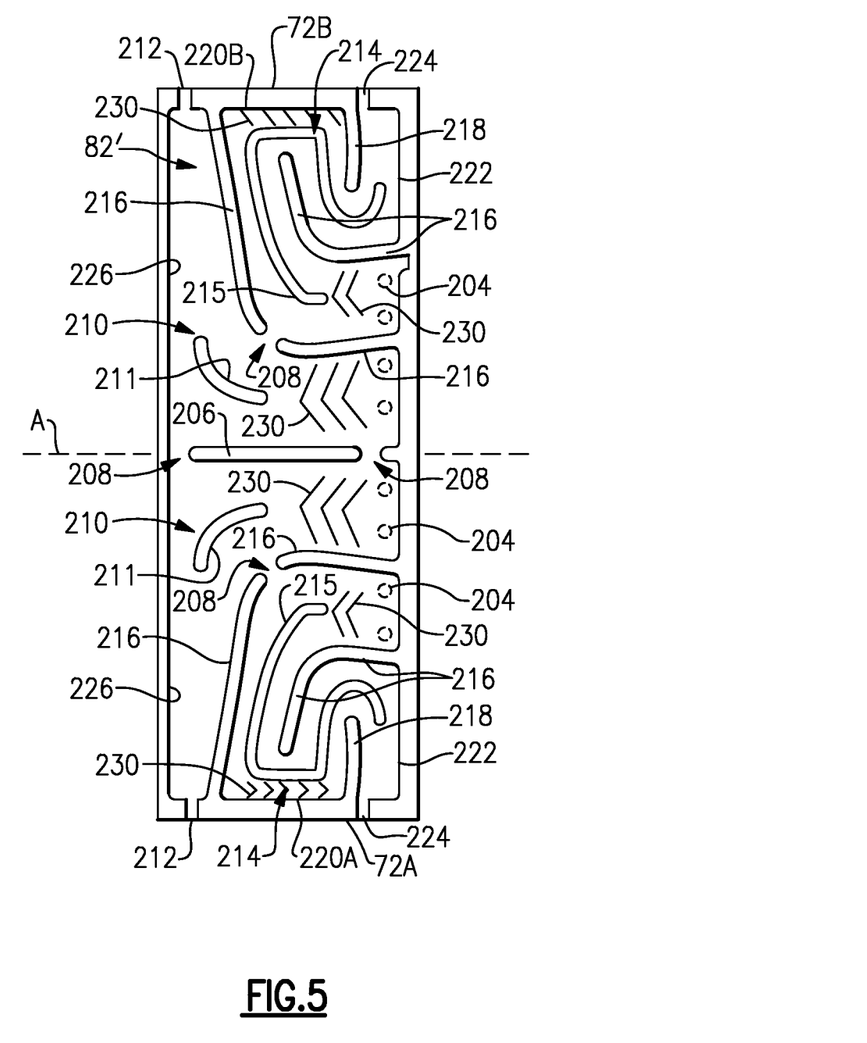
FIG. 5 is a cross-section view taken along line 4-4 of FIG. 3 showing a leading edge cooling channel according to a second embodiment.

FIG. 5 illustrates a cross-sectional view of a leading edge cooling channel 82' according to a second non-limiting embodiment. The leading edge cooling channel 82' is similar to the leading edge cooling channel 82 except where described below or shown in the Figures.

The leading edge cooling channel 82' extends between opposing circumferential ends 72A, 72B of the BOAS 72. Inlets 204 into the leading edge cooling channel 82' from the inlet holes 102 are shown in dashed lines to indicate the location of the cooling fluid S entering the leading edge cooling channel 82'. In the illustrated non-limiting embodiment, the inlets 204 are located adjacent a downstream edge 222 of the leading edge cooling channel 82'. In another non-limiting embodiment, the inlets 204 are located in an axial mid-portion of the leading edge cooling channel 82'.

The leading edge cooling channel 82' is generally symmetric about a central dividing wall 206 that extends parallel to the axis A of the gas turbine engine 20, such that opposing sides of the leading edge cooling channel 82' mirror each other. The opposing sides of the leading edge cooling channel 82' may mirror each other and still include variations in the width of the passages or locations of specific structures while still mirroring the same pattern to tailor the cooling requirements of the opposing sides. In another non-limiting embodiment, the opposing sides are mirror images of each other. The central dividing wall 206 includes bridges 208 that form discontinuities in the central dividing wall 206. The bridges 208 are formed to improve the manufacturability of the leading edge cooling channel 82' and to improve rigidity of the BOAS 72. The bridges 208 can also increase convective heat transfer by introducing turbulence into the cooling fluid S traveling through the leading edge cooling channel 82'.

A pair of L-shaped passages 210 are located immediately adjacent each side of the central dividing wall 206. The pair of L-shaped passages 210 taper toward outlets 212 adjacent the opposing circumferential ends 72A, 72B of the BOAS 72. The outlets 212 may be shifted axially relative to the axis A between the opposing circumferential ends 72A, 72B. Each of the pair of L-shaped passages 210 begin adjacent the inlets 204 of the inlet holes 102 adjacent the downstream edge 222 of the leading edge cooling channel 82' and extend at least partially along a leading edge 226 of the leading edge cooling channel 82' and an intermediate wall 216.

A flow director 211 is located in each of the pair of L-shaped passages 210. The flow directors 211 include a curved shape and are located in a bend or turn in the L-shaped passages 210. In one non-limiting embodiment, the flow directors 211 include a portion extending parallel to the central dividing wall 206 and a portion extending parallel to the leading edge 226. The flow directors 211 reduce non-uniformity in the flow through the L-shaped passages 210 to reduce the number of areas that are under or over cooled to increase the overall cooling effectiveness of the cooling design.

Serpentine passages 214 are at least partially defined by the intermediate walls 216 and an end wall 218. Circumferential edges 220A, 220B and the downstream edge 222 also at least partially define the serpentine passages 214. The circumferential edge 220A is adjacent a blade arrival edge ("BAE") and the circumferential edge 220B is adjacent a blade departure edge ("BDE"). The serpentine passage 214 includes a portion that extends in the axial direction along the circumferential edges 220A and 220B to further increase cooling on the opposing circumferential ends 72A and 72B of the BOAS 72. The intermediate walls 216 may or may not include the bridges 108 that form discontinuities in the intermediate walls 216. The bridges 208 are formed to improve the manufacturability of the leading edge cooling channel 82' and to improve rigidity of the BOAS 72. The intermediate walls 216 include a curvature and extend between the downstream edge 222 and contact or are located adjacent to a corresponding one of the circumferential edges 220A, 220B. The cooling fluid exits the serpentine passages 214 through downstream outlets 224 adjacent the downstream edge 222 of the leading edge cooling channel 82'. The downstream outlets 224 may be shifted axially relative to the axis A between the opposing circumferential ends 72A, 72B.

Each of the serpentine channels 214 include a serpentine channel rib 215 extending at least partially along a length of the serpentine channel 214 located in a mid-portion of the serpentine channel 214. The serpentine channel ribs 215 include a curved shape that follows the serpentine pattern of the serpentine channel 214. In the illustrated non-limiting embodiments, the serpentine channel rib 215 is located downstream of the inlets 204 and upstream of the outlets 224. The serpentine channels ribs 215 reduce flow separation, static coolant zones, and high movement coolant zones to increase uniformity in flow through the serpentine channels 214 to increase overall cooling effectiveness.

Additionally, trip strips 230 may be located in the L-shaped passages 210 and the serpentine passages 214. The trip strips 230 may be chevron shaped, skewed, segmented skewed, perpendicular to the flow, or in the form of pedestals. Although the serpentine passages 214 are shown with a combination a chevron and skewed trip strips 230 along the circumferential edges 220A, 220B, the serpentine passages 214 could also include all chevron shaped trip strips 230 or all skewed trip strips 230 along the circumferential edges 220A, 220B.

The trip strips 230 may also be located in the entirety of the L-shaped passages 210 and the serpentine passages 214 or only in select portions of the L-shaped passages 210 and the serpentine passages 214 as shown in FIG. 4 with the trip strips 130. The trip strips 230 introduce turbulence into the cooling fluid S traveling through the leading edge cooling channel 82' and convective heat transfer between the cooling fluid S and the surrounding structure of the BOAS 72.

The trip strips 230 are oriented to ensure maximum internal convective heat transfer at the outer edges of the trip strips 230 adjacent the high heat load along the circumferential edges 220A, 220B of the leading edge cooling channel 82. The two separate serpentine passages 214 allow for tailoring of circumferential flow distribution in order to optimize the convective heat transfer and cooling air heat pickup in each serpentine passage 214 independently. Flow and trip strip 230 spacing can be tailored depending on non-uniformity of circumferential external heat load distribution resulting from the fuel nozzle, the vane count, and the BOAS 72 count. Although the trip strips 230 are shown in the serpentine passages 214, the trip strips 230 could also be located in the serpentine passages 114. Each of the serpentine passages 214 also allow for tailoring of the internal convective heat transfer in the axial flow direction adjacent to the BAE or the BDE.

Although it is desirable to orient the trip strips 130, 230 such that the highest convective heat transfer occurs at the leading edge of the trip strip 130, 230 along surfaces 220A and 220B in order to maximize local convective heat transfer along the BAE and/or BDE, alternative trip strip arrangements, including pin fins, and other alternative heat transfer augmentation devices may be implemented to provide a more distributed level of internal convective heat transfer to enable more uniform heat conduction along each of the axial passages adjacent to the BAE and/or BDE.

The preceding description is exemplary rather than limiting in nature. Variations and modifications to the disclosed embodiments may become apparent to those skilled in the art that do not necessarily depart from the essence of this disclosure. The scope of legal protection given to this disclosure can only be determined by studying the following claims.

What is claimed is:

1. A gas turbine engine component comprising:
    a wall portion; and
    a leading edge cooling channel extending through the wall portion, the leading edge cooling channel including at least one first cooling passage separated from at least one serpentine cooling passage, wherein the at least one first cooling passage includes a pair of first cooling passages and the at least one serpentine cooling passage includes a pair of serpentine cooling passages, the pair of first cooling passages are L-shaped and at least partially surround a corresponding one of the pair of serpentine cooling passages.

2. The component of claim 1, comprising a plurality of trip strips along at least one of a leading edge or a circumferential edge of the leading edge cooling channel.

3. The component of claim 1, wherein the at least one first cooling passage includes a flow director in a bend of the at least one first cooling passage.

4. The component of claim 1, wherein the at least one serpentine passage includes a serpentine channel rib extending at least partially along a length of the at least one serpentine passage along a mid-portion of the at least one serpentine passage.

5. The component of claim 1, including a plurality of cooling channeling extending radially inward and upstream from a cooling cavity at least partially defined by the component through the component to the leading edge cooling channel.

6. The component of claim 1, wherein the pair of first cooling passages are separated from each other by a central wall extending axially relative to a longitudinal axis of the gas turbine engine through the leading edge cooling passage.

7. The component of claim 6, wherein the pair of first cooling passages and the pair of serpentine cooling passages mirror each other about the central wall and the pair of serpentine cooling passages include an axially extending portion along opposing edges of the component.

8. The component of claim 1, wherein each of the pair of serpentine passages are located downstream of a corresponding one of the pair of first cooling passages and each of the pair of first cooling passages are separated from each of the pair of serpentine passages by an intermediate wall.

9. A gas turbine engine assembly comprising:
    a blade outer air seal including a leading edge cooling channel extending through a wall portion, the leading edge cooling channel including at least one first cooling passage separated from at least one serpentine cooling passage; and
    a seal at least partially axially aligned with the leading edge cooling channel and interfacing with the blade outer air seal, wherein the seal is a brush seal.

10. The assembly of claim 9, including a plurality of cooling channeling extending radially inward and upstream from a cooling cavity at least partially defined by the blade outer air seal and through the blade outer air seal to the leading edge cooling channel.

11. The assembly of claim 9, wherein the at least one first cooling passage includes a pair of first cooling passages and the at least one serpentine cooling passage includes a pair of serpentine cooling passages, the pair of first cooling passages are L-shaped and at least partially surround a corresponding one of the pair of serpentine cooling passages and a plurality of trip strips along at least one of a leading edge or a circumferential edge of the leading edge cooling channel.

12. The assembly of claim 9, wherein the at least one first cooling passage includes a flow director located in a bend of the at least one first cooling passage.

13. The assembly of claim 9, wherein the at least one serpentine passage includes a serpentine channel rib extending at least partially along a length of the at least one serpentine passage along a mid-portion of the at least one serpentine passage.

14. The assembly of claim 11, wherein the pair of first cooling passages and the pair of serpentine cooling passages mirror each other about a central wall and the pair of serpentine cooling passages include an axially extending portion along opposing edges of the component.

15. A method of cooling a component in a gas turbine engine comprising:
   directing a cooling fluid through a cooling channel in the component from a cooling cavity adjacent the component to a leading edge cooling channel; and
   directing the cooling fluid outward towards opposing circumferential ends of the component through a first pair of cooling passages and a pair of serpentine passages, wherein the pair of first cooling passages are L-shaped and at least partially surround a corresponding one of the pair of serpentine cooling passages.

16. The method of claim 15, wherein the first pair of cooling passages and the pair of serpentine passages mirror each other and the cooling fluid is directed radially inward and upstream through the cooling channel.

17. The method of claim 15, comprising directing cooling fluid through each of the first pair of cooling passages with a flow director located in a bend in each of the first pair of cooling channels.

18. The method of claim 15, comprising directing cooling fluid through each of the pair of serpentine passages with a serpentine channel rib extending at least partially along a length of each of the pair of serpentine passages along a mid-portion of each of the pair of serpentine passages and the pair of serpentine passages include a portion extending in an axial direction.

* * * * *